United States Patent [19]
Abeler et al.

[11] Patent Number: 5,238,605
[45] Date of Patent: Aug. 24, 1993

[54] PROCESS FOR THE PREPARATION OF A STABILISER FOR HALOGEN-CONTAINING POLYMERS

[75] Inventors: Gerd Abeler, Darmstadt; Reiner Fuchs, Ober-Ramstadt; Kornelia Malzacher, Lindenfels, all of Fed. Rep. of Germany

[73] Assignee: Ciba-Geigy Corporation, Ardsley, N.Y.

[21] Appl. No.: 840,676

[22] Filed: Feb. 21, 1992

Related U.S. Application Data

[63] Continuation of Ser. No. 663,497, Mar. 1, 1991, abandoned.

[30] Foreign Application Priority Data

Mar. 9, 1990 [CH] Switzerland .................. 763/90

[51] Int. Cl.$^5$ .................. C09K 15/32; C08K 5/57; C08K 3/34; C08K 3/00
[52] U.S. Cl. .................. 252/400.1; 252/400.3; 252/400.31; 252/400.52; 524/178; 524/291; 524/430; 524/445; 524/448; 524/492
[58] Field of Search .............. 524/178, 430, 445, 448, 524/291, 492; 252/400.1, 400.3, 400.31, 400.52

[56] References Cited

U.S. PATENT DOCUMENTS

| | | | |
|---|---|---|---|
| 3,830,751 | 8/1974 | Stapfer et al. | 252/400.3 |
| 4,681,632 | 7/1987 | Bes et al. | 106/491 |
| 4,910,244 | 3/1990 | Dierdorf et al. | 524/178 |

FOREIGN PATENT DOCUMENTS

| | | | |
|---|---|---|---|
| 1248661 | 8/1964 | Fed. Rep. of Germany. | |
| 55-71741 | 5/1980 | Japan. | |
| 5071741 | 5/1980 | Japan | 524/178 |
| 1053805 | 1/1967 | United Kingdom. | |

OTHER PUBLICATIONS

R. Gächter, et al., Plastics Additives Handbook p. 209 (1984).
C.A. 93, 133379x (1980).
Chemical Abstracts 80, 4361t (1974).
Derwent AN 90–048262[07].
Derwent Abst. 39381c/22.
Derwent Abst. 67311y/38.
Derwent Abst. 67310y/38.
Derwent Abst. 14002y/08.
Derwent Abst. 87–012639/02.
Derwent Abst. 33689c/19.

*Primary Examiner*—Paul R. Michl
*Assistant Examiner*—Tae H. Yoon
*Attorney, Agent, or Firm*—Luther A. R. Hall; William A. Teoli, Jr.

[57] ABSTRACT

There is disclosed a process for the preparation of a powdered stabilizer mixture comprising tin stabilizers and adsorbents, which process comprises mixing and heating at least one carboxylic acid or a carboxylic anhydride, at least one organotin oxide and at least one, preferably mineral, adsorbent.

14 Claims, No Drawings

PROCESS FOR THE PREPARATION OF A STABILISER FOR HALOGEN-CONTAINING POLYMERS

This application is a continuation, of application Ser. No. 663,497, filed Mar. 1, 1991 now abandoned.

The present invention relates to a process for the preparation of a stabiliser for halogen-containing polymers, to a stabiliser prepared by said process, and to the use of said stabiliser for stabilising halogen-containing polymers.

A process for stabilising halogen-containing polymers is disclosed in DE-A 2 209 022. The polymers are blended with a premixed product consisting of a stabiliser and a synthetic powdered silicate, which stabiliser may be, for example, an organometallic sulfur compound or a metal carboxylate.

A granular additive for rigid PVC containing a liquid organotin stabiliser which is applied to a finely particulate inorganic adsorbent is disclosed in NL-A 78/11 090. The preferred carrier is $SiO_2$, and the additive contains, in addition to the organotin compound, a stabilising lubricant, a lubricant and fluorescent whitening agents, pigments and the like.

A powder or granular composition which contains colloidal silica in addition to, for example, dioctyltin bis(3-mercaptopropionate), is disclosed in JP-A 50-109 943. This stabiliser has good flow properties and is readily dispersible in PVC.

A mixture of liquid dioctyltin bis(isooctylthioglycolate) and finely powdered silica is disclosed as stabiliser for PVC in JP-A 50-109 942.

It is taught in JP-A 52-004 296 that a stabiliser for PVC comprising a metal soap which is solid at room temperature, a liquid component such as dioctyltin bis(isooctylthioglycolate), and further substances and silica particles can be prepared by granulation in a high-speed mixer.

Further stabilisers comprising an organotin component and a powdered or finely particulate carrier material are disclosed in, for example, U.S. Pat. No. 4,681,632, JP-A 61-272 258 and JP-A 55-043 144.

These stabilisers are troublesome to prepare, especially because, for example, the organotin compounds have to be prepared in a separate process step using solvents which must be separated and disposed of or recovered. A further difficulty is the homogenisation of, for example, such organotin compounds in the carriers such as finely particulate silica.

It is the object of the present invention to provide a process in which the shortcomings of the prior art do not occur.

This object is achieved by mixing and heating at least one carboxylic acid or carboxylic anhydride, at least one organotin oxide and at least one adsorbent.

A convenient process is one wherein the carboxylic acid component is a compound of formula I $$R_1—COOH \quad (I),$$

wherein $R_1$ is —H, alkyl of 1 to 18 carbon atoms, alkenyl of 2 to 18 carbon atoms, a —COOH or —R$_2$—COOH radical, wherein $R_2$ is —CH=CH—, alkylene of 1 to 4 carbon atoms, phenylene or phenylene which is substituted by $C_1$-$C_4$alkyl, or is —CH$_2$—CH(OH)—, or $R_1$ is a —CH(XH)—CH$_3$ radical, wherein X=O or S, or $R_1$ is a —CR$_3$R$_4$—(CR$_5$R$_6$)$_n$—SH radical, wherein $R_3$, $R_4$, $R_5$ and $R_6$ are each independently of one another —H or alkyl of 1 to 6 carbon atoms, and n is 0 or 1, or $R_1$ is a a radical

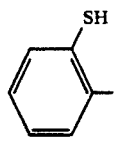

or $R_1$ is phenyl or phenyl which is substituted by $C_1$-$C_6$alkyl and/or OH, or is phenyl-$C_1$-$C_4$alkyl or phenyl-$C_1$-$C_4$alkyl which is substituted in the phenyl moiety by $C_1$-$C_6$alkyl and/or OH, or an anhydride thereof.

A preferred process is one wherein the carboxylic acid component is a compound of formula I, wherein $R_1$ is alkyl of 12 to 18 carbon atoms, or wherein $R_1$ is a —COOH or —R$_2$—COOH radical, wherein $R_2$ is —CH=CH—, alkylene of 1 to 4 carbon atoms or —CH$_2$—CH(OH)—, or wherein $R_1$ is a —CH(SH)—CH$_3$ or —CH(OH)—CH$_3$ radical, or $R_1$ is a —CH$_2$—SH or —CH$_2$—CH$_2$—SH radical, or $R_1$ is a radical

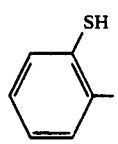

or an anhydride thereof or a mixture of such carboxylic acids or/and anhydrides.

Carboxylic acids of particular interest are, typically, maleic acid, fumaric acid, β-mercaptopropionic acid, thiolactic acid, thioglycolic acid, thiosalicylic acid, lauric acid, palmitic acid or stearic acid.

A particularly preferred process wherein the carboxylic acid or anhydride is thioglycolic acid, 3-mercaptopropionic acid, thiosalicylic acid, maleic acid, maleic anhydride or a mixture thereof.

$R_2$ as phenylene in formula I is preferably o-phenylene. Substituted phenyl or phenylalkyl $R_1$ contains preferably 1-3 substituents. Exemplary of such groups are those of formula

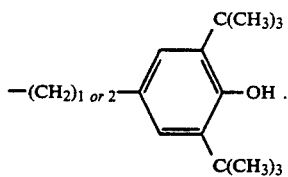

In formula I, $R_4$-$R_6$ are preferably H or CH$_3$, most preferably H.

A useful process is one in which the organotin oxide is a compound of formula II

wherein $R_7$ and $R_8$ are each independently of the other $C_1$-$C_{20}$alkyl, $C_6$-$C_{20}$alkoxycarbonylalkyl, $C_7$-$C_9$phenylalkyl, phenyl or $C_1$-$C_4$alkyl-substituted phenyl.

A preferred process is one in which the organotin oxide is a compound of formula II, wherein $R_7$ and $R_8$ are alkyl of 1 to 18 carbon atoms.

A particularly preferred process is one in which the organotin oxide is a compound of formula II, wherein $R_7$ and $R_8$ are alkyl of 4 to 12 carbon atoms.

$R_7$ and $R_8$ are preferably identical.

The organotin oxide is most preferably dibutyltin oxide, dioctyltin oxide or dilauryltin oxide.

At least one of the two starting materials, organotin oxide and carboxylic acid or carboxylic anhydride, is preferably liquid at room temperature.

A convenient process is one in which the adsorbent is at least one substance selected from silicic acids, diatomaceous earth, silica gel, silicates, clay minerals or activated aluminas. A particulate organic polymer, for example based on melamine/formaldehyde and urea/formaldehyde polymers, may be used as adsorbent. It is preferred to use mineral adsorbents. As silicates alumosilicates such as zeolithes and the like should specifically be mentioned.

The silica gels employed are known per se and commerical products may, for example, be used. Particularly suitable silica gels are typically those having bulk densities of 0.4 to 08 g/ml, most preferably of 0.4 to 0.5 g/ml.

Commercially available diatomaceous earth may be used, conveniently in liter weights of 150-300 g.

The silicates may be the salts and esters of orthosilicic acid.

The alkaline earth metal salts and, preferably, calcium and magnesium salts, of orthosilicic acid are especially preferred.

Further suitable adsorbents are the clay minerals, i.e. colloidal, finely particulate, anhydrous aluminium and-/or magnesium silicates of the montmorillonite group. Such materials are also known as fuller's earth, Florida clay, attapulgite or bentonite. The cited adsorbents also include the aluminas, of which highly dispersed forms are preferred, $\gamma$-alumina being especially preferred.

Some of the cited polymers are commercially available (for example ®Pergopak UF polymers which are urea-formaldehyde condensation products having on the average about 0.6% of reactive methylol groups).

The silicic acids which are known per se are particularly useful. It is especially preferred to use the powdered voluminous forms of silicic acid, the so-called precipitated silicic acids. These precipitated silicic acids have, for example, a pore volume of 2.5-15 ml/g and a specific surface area of 50-500 m$^2$/g. The pyrogenic or gas phase silicic acids are also preferred.

The adsorbent may contain further oxides, typically the alkali metal oxides or alkaline earth metal oxides or the oxides of the metals Al, Ti, Zr, Fe, Co or Ni.

The alkali metal oxides are, typically, $LiO_2$, $Na_2O$, $K_2O$ or $Cs_2O$. $Na_2O$ and $K_2O$ are preferred.

The alkaline earth metal oxides are, typically, MgO, CaO, SrO or BaO. MgO and CaO are preferred. The oxides of Ti and Fe are also preferred.

The adsorbent may also contain a mixture of the above mentioned oxides.

For example, the adsorbent may contain CaO in amounts of up to 30% by weight, preferably 1 to 30% by weight, $Al_2O_3$ in amounts of up to 5% by weight, preferably 1 to 5% by weight, $Fe_2O_3$ in amounts of up to 2%, preferably 1 to 2%, MgO in amounts of up to 20% by weight, preferably 0.1 to 20% by weight, or alkali metal oxides in amounts of up to 2% by weight, preferably 1 to 2% and, most preferably, $Na_2O$ and $K_2O$ in amounts of 1 to 2% by weight, based in each case on the adsorbent.

The process of this invention conveniently comprises mixing the carboxylic acid or carboxylic anhydride and the organotin oxide with the adsorbent such that the mixture always remains free-flowing.

When using carboxylic acids of formula I, the process can be carried out by applying the liquid acid to the adsorbent such that the mixture remains free-flowing. The pretreated absorbent can then be mixed with the organotin oxide and heated, for example, under vacuum. The temperature is conveniently below the melting point of the appropriate organotin compound. When using solid carboxylic acids of formula I, the procedure is analogous, except that adsorbent, carboxylic acid and organotin compound are preferably thoroughly mixed before heating.

The mixing procedure and the reaction proceed simultaneously in both cases, but the reaction can be carried out in different apparatus. For example, mixers can be used as reactors. Such mixers are typically vessels with stirrer, free-flowing mixers, mixers with forced mixing, V-mixers, muller mixers, plow type mixers, paddle mixers, centrifugal mixers, screw mixers, rotary screw mixers or continuous mixers. Preferred mixers are those which can be heated and/or evacuated.

The reaction is preferably carried out in driers which can also be heated and/or evacuated. Such driers are known per se and may be paddle driers, tumbling driers, trough driers, screw driers, vacuum disc driers or vacuum rotary driers.

The individual components, such as adsorbent, carboxylic acid and organotin compound, are charged to the reactor in appropriate manner in accordance with the apparatus employed for the purpose, i.e. the mixer or drier. Liquid components are conveniently sprayed on to the adsorbent by suitable devices.

The reaction takes place at elevated temperature, for example in the range from 40°-120° C., preferably 40°-100° C., more particularly 50°-100° C. and, most preferably, 50°-80° C., for example 60°-80° C. It is preferred to apply a vacuum, for example in the range from 1 bis 500, preferably 1 to 200, more particularly 5 to 200, most preferably 10 to 100 mbar.

Water forms as reaction product and is removed by the drying procedure. The vacuum conveniently applied to the reactor effects a corresponding lowering of the temperature of the drying procedure and thus mild treatment of the stabiliser. In the processes using the carboxylic acid or the carboxylic anhydride, it is preferred to heat the organotin oxide and the adsorbent, under normal pressure, to temperatures of up to 120° C. or, under vacuum, to temperatures of up to 100° C.

The organotin stabilisers formed on the adsorbent are known. For example, the use of educts of formulae I and II gives compounds of formulae, $R_7R_8Sn(OOCR_1)_2$ (where $R_1$ = monovalent radical),

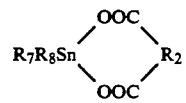

or $R_7R_8Sn—OOC—R_2—COO—SnR_7R_8$ (where $R_2$ = a divalent radical, but where $R_1$ =—COOH, $R_2$ = a direct bond; which compound is formed depends on the stoichiometric ratio of the starting compounds). It will be readily understood that mixtures of organotin compounds can also be formed.

The amount of adsorbent used may be typically 5 to 95% by weight, conveniently 5 to 50% by weight and, preferably, 10 to 20% by weight, based on the stabiliser reaction product.

Exemplary of preferred stabilisers obtainable according to this invention are: dibutyltin β-mercaptopropionate with 10–15% by weight of precipitated silicic acid, dioctyltin β-mercaptopropionate with 10–15% by weight of precipitated silicic acid, dibutyltin maleate with 10% by weight of precipitated silicic acid, dioctyltin maleate with 10% by weight of precipitated silicic acid.

If the adsorbent used is silicic acid, then the amount of adsorbent in the stabiliser mixture is conveniently 5 bis 20% by weight, preferably 10 to 15% by weight and, most preferably, 10% by weight.

The carboxylic acid or the carboxylic anhydride is used typically in 0.95- to 1.05-fold equivalent amount, based on the organotin compound. It is expedient to use equivalent amounts.

The invention also relates to powdered stabiliser mixtures obtainable by mixing and heating at least one mineral adsorbent, at least one organotin oxide and at least one carboxylic acid.

The present invention further relates to the use of the stabiliser obtainable by the process of this invention for stabilising chlorinated polymers, as well as to stabilised chlorinated polymer compositions containing at least one stabiliser obtainable by the process of this invention.

The stabilisers are suitable for stabilising chlorinated polymers, for example the following types of polymers: polymers of vinyl chloride, vinyl resins containing vinyl chloride in their structure, such as copolymers of vinyl chloride and vinyl esters of aliphatic acids, in particular vinyl acetate, copolymers of vinyl chloride with esters of acrylic and methacrylic acid and with acrylonitrile, copolymers of vinyl chloride with dienes and unsaturated dicarboxylic acids or their anhydrides, such as copolymers of vinyl chloride with diethyl maleate, diethyl fumarate or maleic anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and postchlorinated polymers of chlorobutadiene and their copolymers with vinyl chloride, rubber hydrochloride and chlorinated rubber hydrochloride; as well as mixtures of the cited polymers with one another or with other polymerisable compounds.

Further polymers are the graft polymers of PVC with EVA, ABS and MBS. Preferred substrates are also mixtures of the above mentioned homopolymer and copolymers, especially vinyl chloride homopolymers, with other thermoplastic and/or elastomer polymers, especially blends with ABS, MBS, NBR, SAN, EVA, CPE, MBAS, PMA, PMMA, EPDM, polyactones and nitrile rubber.

Other preferred polymers are suspension and mass polymers as well as emulsion polymers.

A particularly preferred chlorinated polymer is polyvinyl chloride, especially suspension polymers, emulsion polymers and mass polymers.

The stabilisers obtained by the process of this invention may be blended with other known stabilisers for chlorinated polymers in order to achieve a further enhanced action. These additional stabilisers may also be added separately to the stabilised chlorinated polymer compositions of this invention.

In the process of this invention itself it is also possible to add at least one further stabiliser, preferably a phenolic antioxidant. One or more such stabilisers is then incorporated in the powdered stabiliser mixtures obtainable by the process of this invention.

Illustrative examples of additional stabilisers which are present in the stabilisers of this invention and/or in the chlorinated polymers are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6- dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl)isocyanurate.

1.6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of β-(3,5-di-tert-butyl-4-hydroxyphenyl)-propionic acid with mono- or polyhydric alcohols, e.g. with methanol, octadecanol, 1,6-hexanediol, neopentyl glycol, triethylene glycol, pentaerythritol, tris(hydroxyethyl) isocyanurate, thiodiethylene glycol, N,N'-bis(hydroxyethyl)oxalodiamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalodiamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxy-benzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o-and p-ethoxydisubstituted oxanilides.

2.7.2-(2-Hydroxyphenyl)-1,3,5-triazines, for example 2,4,6-tris(2-hydroxy-4-octyloxy-phenyl)-1,3,5-triazine, 2-(2-hydroxy-4-octyloxy-phenyl)-4,6-bis(2,4-dimethylphenyl)-1,3,5-triazine, 2-(2,4-dihydroxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

Depending on the end use, still further customary additives can be incorporated in the compositions of the invention, for example:

3. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl)pentaerythritol diphosphite, tristearyl sorbitol triphosphite, tetrakis-(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

4. Compounds which decompose peroxide, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

5. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium stearate, sodium ricinoleate and potassium palmitate, antimony pyrocatecholate or zinc pyrocatecholate.

6. Fillers and reinforcing agents, for example calcium carbonate, silicates, glass fibres, asbestos, talc, kaolin, mica, barium sulfate, metal oxides and hydroxydes, carbon black, graphite.

7. Other additives, for example, plasticisers, lubricants, emulsifiers, pigments, fluorescent whitening agents, flameproofing agents, antistatic agents and blowing agents.

Further costabilisers are epoxy compounds (for example epoxidised soybean oil), 1,3-diketones, organic or inorganic calcium compounds, aminocrotonates, dehydracetic acid and pyrrole derivatives, preferably those described in EP-A 22 087 and in GB-A 2 078 761, for example of formula I as indicated therein, preferably those pyrrole derivatives which are defined in claims 2-9 of EP-A 22 087, for example 2-methyl-3-cyclohexyloxycarbonyl-4-phenyl-1H-pyrrole.

Other stabilisers which may be used in the compositions of the invention are polyols. Typical examples of polyols are pentaerythritol, dipentaerythritol, trimethylolpropane, ditrimethylolpropane, tris(2-hydroxyethyl)isocyanurate (THEIC), which last mentioned compound is preferred, sorbitol, mannitol and inositol.

Further costabilisers are the 1,4-dihydropyridine-2,5-dicarboxylic acids described, for example, in U.S. Pat. No. 4,214,088, as well as hydrotalcites, for example those of formula $$M^{2+}_{1-x}M^{3+}_x\cdot(OH)_2\cdot(A^{n-})_{x/n}\cdot mH_2O$$

wherein
$M^{2+}$ = Mg, Ca, Sr, Ba, Zn, Cd, Pb, Sn and/or Ni,
$M^{3+}$ = Al, B or Bi ist,
$A^n$ is an anion having the valency n,
n is a number from 1–4,
x is a number from 0–0.5,
m is a number from 0–2, and
A = $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$ $$\begin{matrix} COO^- \\ | \\ COO^- \end{matrix},$$

$(CHOHCOO)_2^{2-}$, $(CHOH)_4CH_2OHCOO^-$, $C_2H_4(COO)_2^{2-}$, $(CH_2COO)_2^{2-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$.

Other hydrotalcites which may be used are compounds of the general formula Ia $$M_x^{2+}Al_2(OH)_{2x+6nz}(A^{n-})_2\cdot mH_2O$$

wherein $M^{2+}$ is at least one metal selected from the group consisting of Mg and Zn and is preferably Mg, $A^{n-}$ is an anion, for example selected from the group consisting of $CO_3^{2-}$, $$\begin{pmatrix} COO^- \\ | \\ COO^- \end{pmatrix}^{2-}, OH^- \text{ and } S^{2-},$$

where n is the valency the anions, m is a positive number, preferably from 0.5 to 5, and x and z are positive numbers, and x is preferably 2 to 6 and z is smaller than 2.

It is also possible to use as additional stabilisers metal carboxylates and metal phenolates of metals of the second main group and second subgroup of the periodic system, or also inorganic salts of metals of the second subgroup of the periodic system, for example $ZnCl_2$.

Illustrative examples of metal carboxylates are the metal salts of saturated, unsaturated or hydroxylated aliphatic carboxylic acids of 6 to 20 carbons, such as hexanoic acid, heptanoic acid, octanoic acid, 2-ethylhexanoic acid, undecyloic acid, lauric acid, myristic acid, palmitic acid, stearic acid, 12-oxystearic acid, oleic acid, linoleic acid or ricinolic acid. Also of interest are the metal salts of aromatic carboxylic acids such as substituted phenyl benzoates. Preferred are metals of the series Ba, Sr, Ca, Mg, Zn and Cd. Exemplary of preferred metal carboxylates are calcium or zinc stearate and zinc and calcium oleate.

Particularly suitable metal phenolates are the metal salts of phenols containing 6–20 carbon atoms, for example alkylphenols such as p-tert-butylphenol, p-octylphenol, p-nonylphenol or p-dodecylphenol. Typical examples of such metal phenolates are Ba-p-tert-butyl benzoate or Ba-p-n-nonyl phenolate.

The solvent-free process of this invention has, for example, the advantages that separation, disposal and recovery of solvents can be dispensed with.

The invention is illustrated in more detail by the following Examples in which, unless otherwise stated, parts and percentages are by weight.

EXAMPLE 1

14.9 kg of precipitated silicic acid (Ultrasil VN3) are charged to a tumbling drier and 20.14 kg of (liquid) β-mercaptopropionic acid are slowly charged to the drier, which is in motion, such that the mixture remains free-flowing. Then 72.05 kg of dioctyltin oxide are added and a vacuum of 30 mbar is applied to the paddle drier. With constant agitation, the mixture is then heated in the tumbler drier to 70° C. for 1 hour. The final product is a free-flowing colourless powder.

EXAMPLE 2

10 kg of precipitated silicic acid (Ultrasil VN3) and 5.84 kg of maleic acid are charged to the baffled round flask of a rotary evaporator. While rotating the flask, 16.16 kg of β-mercaptopropionic acid are added slowly such that the reaction mixture remains free-flowing. Then 75.56 kg of dioctyltin oxide (96%) are added and a vacuum of 25 mbar is applied. With constant rotation, the mixture is heated for 45 minutes to 60° C. The final product is a free-flowing white powder.

EXAMPLE 3

5 kg of precipitated silicic acid (Ultrasil VN3), 4.88 kg of maleic acid, 62.97 kg of dioctyltin oxide (95%) and 20 kg of triethylene glycol bis[3-(3-tert-butyl-4-hydroxy-5-methylphenyl)]propionate are mixed by rotation in the baffled round flask of a rotary evaporator, and the mixture is kept for 10 minutes at 25° C. Then 13.47 kg of β-mercaptopropionic acid are added constantly over 20 minutes. After a further 20 minutes the mixture is heated to 50° C. for 60 minutes while applying a vacuum of 25 mbar. The final product is a white free-flowing powder.

EXAMPLE 4

The procedure of Example 1 is repeated, using in place of β-mercaptopropionic acid the equivalent amount of maleic acid, to give an organotin stabiliser in the form of a white free-flowing powder.

EXAMPLE 5

The procedure of Example 1 is repeated, using in place of β-mercaptopropionic acid the equivalent amount of thioglycolic acid, to give an organotin stabiliser in the form of a white free-flowing powder.

EXAMPLE 6

The procedure of Example 1 is repeated, using in place of β-mercaptopropionic acid the equivalent amount of thiosalicylic acid, to give an organotin stabiliser in the form of a white free-flowing powder.

EXAMPLE 7

A mixture of 100 parts by weight of an emulsion PVC having a K-value of 78, 3 parts by weight of montan wax and 0.5 parts of the stabiliser obtained according to Example 1 are rolled on a roll mill for 10 minutes at 180° C. Samples of the 0.3 mm rolled sheet obtained are subjected to heat ageing in a vaccum drier at 200° C. The Yellowness Index (YI) of the samples is determined at regular intervals according to ASTM D 1925. The results are reported in Table 1.

TABLE 1

| minutes | YI values at 2 minute intervals | | | | |
|---|---|---|---|---|---|
|  | 0 | 2 | 4 | 6 | 8 |
| YI values | 26 | 29 | 38 | 50 | 100 |

What is claimed is:

1. A process for the preparation of a powdered stabilizer mixture comprising tin stabilizers and adsorbents, which process consists essentially of mixing and heating to a temperature between 40° and 120° C. at least one carboxylic acid or carboxylic anhydride, at least one organotin oxide and at least one adsorbent selected from the group consisting of silicic acids, diatomaceous earth, silicates, clay minerals, activated aluminas and particulate organic polymers.

2. A process according to claim 1, wherein the carboxylic acid component is a compound of formula I $$R_1\text{—COOH} \qquad (I),$$

wherein $R_1$ is —H, alkyl of 1 to 18 carbon atoms, alkenyl of 2 to 18 carbon atoms, a —COOH or —R$_2$—COOH radical, wherein $R_2$ is —CH=CH—, alkylene of 1 to 4 carbon atoms, phenylene or phenylene which is substituted by $C_1$-$C_4$alkyl, or is —CH$_2$—CH(OH)—, or $R_1$ is a —CH(XH)—CH$_3$ radical, wherein X=O or S, or $R_1$ is a —CR$_3$R$_4$—(CR$_5$R$_6$)$_n$—SH radical, wherein $R_3$, $R_4$, $R_5$ and $R_6$ are each independently of one another —H or alkyl of 1 to 6 carbon atoms, and n is 0 or 1, or $R_1$ is a radical

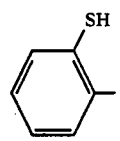

or $R_1$ is phenyl or phenyl which is substituted by $C_1$-$C_6$alkyl and/or OH, or is phenyl-$C_1$-$C_4$alkyl or phenyl-$C_1$-$C_4$alkyl which is substituted in the phenyl moiety by $C_1$-$C_6$alkyl and/or OH, or an anhydride thereof.

3. A process according to claim 1, wherein the carboxylic acid component is a compound of formula I, wherein $R_1$ is alkyl of 12 to 18 carbon atoms, or wherein $R_1$ is a —COOH or —R$_2$—COOH radical, wherein $R_2$ is —CH=CH—, alkylene of 1 to 4 carbon atoms or —CH$_2$—CH(OH)—, or wherein $R_1$ is a —CH(SH)—CH$_3$ or —CH(OH)—CH$_3$ radical, or $R_1$ is a —CH$_2$—SH or —CH$_2$—CH$_2$—SH radical, or $R_1$ is a radical

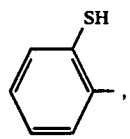

or an anhydride thereof or a mixture of such carboxylic acids or/an anhydrides.

4. A process according to claim 1, wherein the carboxylic acid or anhydride is selected from thioglycolic acid, 3-mercaptopropionic acid, thiosalicylic acid, maleic acid, maleic anhydride or a mixture thereof.

5. A process according to claim 1, wherein the organotin oxide is a compound of formula II

wherein $R_7$ and $R_8$ are each independently of the other $C_1$-$C_{20}$alkyl, $C_6$-$C_{20}$alkoxycarbonylalkyl, $C_7$-$C_9$phenylalkyl, phenyl or $C_1$-$C_4$alkyl-substituted phenyl.

6. A process according to claim 5, wherein the organotin oxide is a compound of formula II, wherein $R_7$ and $R_8$ are alkyl of 1 to 18 carbon atoms.

7. A process according to claim 5, wherein the organotin oxide is a compound of formula II, wherein $R_7$ and $R_8$ are identical and are alkyl of 4 to 12 carbon atoms.

8. A process according to claim 1, wherein the adsorbent contains an alkali metal oxide or an alkaline earth metal oxide or an oxide of the metals Al, Ti, Zr, Fe, Co or Ni or a mixture of these oxides.

9. A process according to claim 1, wherein the carboxylic acid or carboxylic anhydride and the organotin oxide is mixed with the adsorbent such that the mixture always remains free-flowing.

10. A process according to claim 1, wherein the carboxylic acid or carboxylic anhydride, the organotin oxide and the adsorbent are heated under normal pressure to temperatures in the range of up to 120° C. or under vacuum to temperatures of up to 100° C.

11. A process according to claim 1, wherein the carboxylic acid or carboxylic anhydride is used in 0.95- to 1.05-fold equivalent amount, based on the organotin oxide.

12. A process according to claim 1, wherein the amount of adsorbent in the stabilizer mixture is 5 to 95% by weight.

13. A process according to claim 1, wherein the mixture additionally contains a further stabilizer.

14. A process according to claim 13 wherein the further stabilizer is a phenolic antioxidant.

* * * * *